(12) United States Patent
Deogun et al.

(10) Patent No.: US 7,882,370 B2
(45) Date of Patent: Feb. 1, 2011

(54) STATIC PULSED BUS CIRCUIT AND METHOD HAVING DYNAMIC POWER SUPPLY RAIL SELECTION

(75) Inventors: Harmander Singh Deogun, Austin, TX (US); Kevin J. Nowka, Georgetown, TX (US); Rahul M. Rao, Elmsford, NY (US); Robert M. Senger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 11/469,578

(22) Filed: Sep. 1, 2006

(65) Prior Publication Data

US 2008/0069558 A1    Mar. 20, 2008

(51) Int. Cl.
*G06F 1/26* (2006.01)
(52) U.S. Cl. ................. 713/300; 713/320; 713/323; 398/4; 398/5; 398/6
(58) Field of Classification Search ........... 713/300, 713/320, 323; 398/4, 5, 6
See application file for complete search history.

(56) References Cited

U.S. PATENT DOCUMENTS

| | | | | |
|---|---|---|---|---|
| 6,255,853 | B1 * | 7/2001 | Houston | 326/98 |
| 6,900,666 | B2 * | 5/2005 | Kursun et al. | 326/95 |
| 7,088,141 | B2 | 8/2006 | Deogun et al. | |
| 2003/0038653 | A1 | 2/2003 | Ooishi et al. | |
| 2006/0023519 | A1 | 2/2006 | Choi et al. | |

OTHER PUBLICATIONS

Khellah, et al.. "Static Pulsed Bus for On-Chip Interconnects", 2002 Symposium on VLSI Circuits Digest of Technical Papers, IEEE Press, 2002.
P. Saxena, "The scaling challenge: can correct-by-construction design help?" International Symposium on Physical Design, 2002.
K. Usami and M. Horowitz, "Clustered Voltage Scaling Technique for Low-Power Design," Proc. International Symposium on Low Power Electronics and Design, pp. 3-8, 1995.
C. Chen et. al., "On Gate Level Power Optimization using Dual Supply Voltages," IEEE Transactions on VLSI, vol. 9, pp. 616-629, Oct. 2001.

(Continued)

*Primary Examiner*—Nitin C Patel
(74) *Attorney, Agent, or Firm*—Mitch Harris, Atty at Law, LLC; Andrew M. Harris; Libby Z. Toub

(57) ABSTRACT

A static pulse bus circuit and method having dynamic power supply rail selection reduces static and dynamic power consumption over that of static pulse bus designs with fixed power supply rail voltages. Every other (even) bus repeater is operated with a selectable power supply rail voltage that is selected in conformity with a state of the input signal of the bus repeater. The odd bus repeaters are operated from the lower of the selectable power supply voltages supplied to the even repeaters. The odd bus repeaters may also be operated from a selectable power supply rail voltage opposite the selectable-voltage power supply rail provided to the even bus repeaters, in which case the opposing rail of the even bus repeaters is set to the higher of the voltages selectable in the odd bus repeaters.

25 Claims, 4 Drawing Sheets

OTHER PUBLICATIONS

K. Usami et. al., "Automated Low-Power Technique Exploiting Multiple Supply Voltages Applied to a Media Processor," IEEE Journal of Solid Static Circuits, pp. 463-472, Mar. 1998.

M. Hamada, Y. Ootaguro and T. Kuroda, "Utilizing Surplus Timing for Power Reduction," Proc. Custom Integrated Circuits Conference, pp. 89-92, 2001.

M. Takahashi et. al., "A 60-mW MPEG4 Video Codec Using Clustered Voltage Scaling with Variable Supply-Voltage Scheme," IEEE Journal of Solid State Circuits, pp. 1772-1780, Nov. 1998.

T. Kuroda and M. Hamada, "Low-Power CMOS Digital Design with Dual Embedded Adaptive Power Supplies," IEEE Journal of Solid State Circuits, pp. 652-655, Apr. 2000.

S. Kulkarni, A. Srivastava and D. Sylvester, "A New Algorithm for Improved VDD Assignment in Low Power Dual VDD Systems," Proc. International Symposium on Low Power Electronics and Design, pp. 200-205, 2004.

D. Chinnery and K. Keutzer, "Linear Programming for Sizing, Vth and Vdd Assignment," International Symposium on Low Power Electronic Design, pp. 149-154, 2005.

H. Kaul and D. Sylvester, "A Novel Buffer Circuit for Energy Efficient Signaling in Dual-VDD Systems," Great Lakes Symposium on VLSI, pp. 462-467, 2005.Great Lakes Symposium on VLSI, pp. 462-467, 2005.

* cited by examiner

STATIC PULSED BUS CIRCUIT AND METHOD HAVING DYNAMIC POWER SUPPLY RAIL SELECTION

BACKGROUND OF THE INVENTION

1. Technical Field

The present invention relates generally to electronic interface bus circuits, and more particularly to a pulsed bus circuit and operating method having dynamic power supply rail selection.

2. Description of the Related Art

Low power electronic systems incorporating large parallel buses are increasingly prevalent, as microprocessor systems are used in notebook computers, personal digital assistants (PDAs) and other electronic appliances designed for portable battery-operated use. Power consumption is also an increasingly important issue in general, as increasing deployment of large-scale computing systems along with an increase in processing power and consequent rise in power consumption raises the cost of operating those systems to businesses and society at-large.

As circuit operating frequencies and die/circuit sizes increase and operating voltages decrease, bus repeaters are necessary in increasing proportion to interconnect internal circuits in high-density electronic devices. The repeaters are necessary to maintain propagation delay and signal skew at tolerable levels as circuit technologies advance. However, inclusion of large numbers of bus repeaters raises quiescent bus power consumption of the device including them significantly, due to an increased number of power supply leakage paths provided through the repeaters, even when the repeaters are inactive. The dynamic bus power consumption is also increased, due to the additional drive elements included on the bus.

One bus repeater solution that has been implemented to reduce the power consumed by interface buses, is a "static pulsed bus." The static pulsed bus has desirable characteristics in that signal delay and power dissipation due to inter-bus-line coupling capacitance is decreased. Static pulse bus circuits operate by propagating pulses instead of levels, and the pulses are unidirectional for each set of parallel bus segments, reducing the energy used to charge the inter-bus-line coupling capacitance. The presence of a pulse during a period indicates a change in logic state on the particular bus-line and the absence of a pulse indicates no change in logic state. When two parasitically-coupled bus lines transition in the same direction, the effect of the coupling capacitance is zero. When only one bus line transitions, the effect is half of that of the worst-case condition of opposite transitions on the bus lines, which occur in non-pulsed bus designs. Standard buses also have increased current drive requirement in the repeaters in order to overcome the above-described worst-case switching condition, leading to increased leakage through the larger devices.

Therefore, static pulsed bus designs are desirable due to the reduction in both dynamic power consumption due to the reduced effective inter-bit-line capacitance and static leakage current. However, even though static pulsed bus designs lower the power consumption of bus repeater circuits, their power consumption is still significant due to the increasing number of bus repeaters required in emerging electronic devices.

Therefore, it would be desirable to provide a static pulsed bus architecture that further reduces bus power consumption due to leakage and dynamic power consumption.

SUMMARY OF THE INVENTION

The objectives of reducing bus power consumption in a static pulsed bus repeater circuit is accomplished in a method and apparatus. The method is a method of operation of the apparatus which is a bus interface circuit including a plurality of bus repeaters.

The bus repeaters are organized into alternating groups of repeaters, corresponding to odd and even positions within the cascade of repeaters on each bus line. A first (even) group of bus repeaters has a selectable power supply voltage at one of the power supply rails of the bus repeaters in the first group. The power supply voltage is selected in conformity with the state of the signal input of the bus repeater, so that when a pulse is received by the repeater, the power supply voltage is increased while the (opposite polarity) output pulse is being relayed to the next bus repeater. The power supply voltage can be selected by an analog selector having a select input coupled to the input of the repeater. The second (odd) group of repeaters operates from the lower power supply rail selectable at the first group of repeaters.

The second group of repeaters may also include a selectable power supply voltage on the power supply rail opposite the power supply rail that has selectable voltage in the first group of repeaters. If so, then the first group of repeaters has a second power supply rail (opposite the selectable-voltage power supply rail) that is set to the higher of the voltages selectable at the second group of repeaters.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
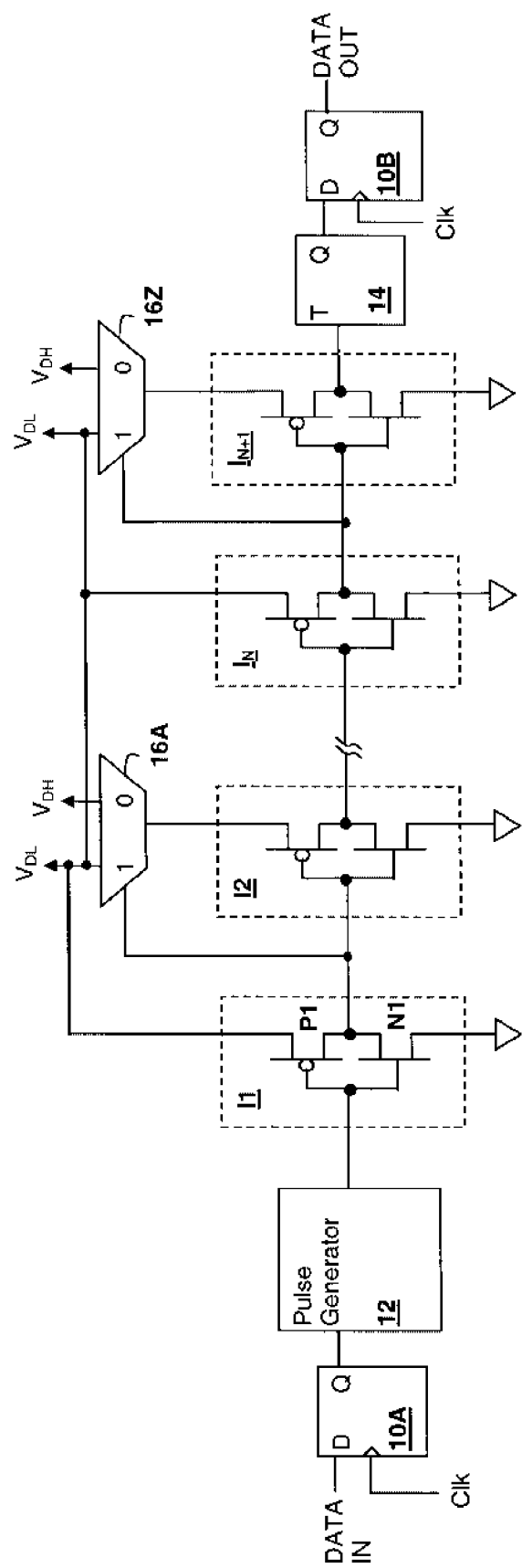
FIG. 1 is a schematic diagram of a bus in accordance with an embodiment of the invention.

With reference now to the figures, and in particular with reference to FIG. 1, a schematic diagram of a bus circuit embodying a method and an apparatus in accordance with the present invention is shown. A data signal is conveyed from an input node DATA IN to an output node DATA OUT by a static pulsed bus circuit as shown. A cascade of inverters, represented by inverters I1, I2 through $I_N$, $I_{N+1}$ repeat a pulsed bus signal provided by a pulse generator 12 that generates pulses in response to changes in a data signal latched by a clock signal clk from input node DATA IN by a latch 10A. The polarity of the pulses is opposite from one stage to the next in the illustrated circuit due to the inversion through inverters I1, I2 through $I_N$, $I_{N+1}$. While the illustrative embodiment shows bus repeaters as inverters I1, I2 through $I_N$, $I_{N+1}$, it is contemplated that other circuits can be used as bus repeaters in other embodiments of the present invention. The data signal is reconstructed at the opposite end of the interface by a toggle flip-flop 14 and is latched by a latch 10B by clock signal clk.

In the depicted embodiment, the first power rail of odd-numbered inverters exemplified by inverters I1 and $I_N$ is statically provided from power supply $V_{DL}$, but the power supply voltage across even-numbered inverters I2 and $I_{N+1}$ is dynamically selected by selectors 16A through 16Z and applied to the first power supply rail of inverters I2 and $I_{N+1}$. The second power supply rail of all of inverters I1, I2 through $I_N$, $I_{N+1}$ is connected to a third power supply value, which in the illustrated circuit is ground. When a falling-voltage pulse is present at the input of even stage inverters I2 and $I_{N+1}$, the power supply voltage provided to the positive supply rails of inverters I2 and $I_{N+1}$ is boosted from the voltage of power supply $V_{DL}$ to the voltage level of power supply $V_{DH}$. The result is that the delay of inverters I2 and $I_{N+1}$ is reduced in producing the positive pulses at the outputs of inverters I2 and $I_{N+1}$ during the pulse propagation, but the power supply voltage level is quickly restored to a lower level after the pulse has been propagated. In the depicted embodiment, the power supply voltage across odd inverters such as I1 and $I_N$ is fixed at $V_{DL}$. $V_{DL}$ is generally chosen as approximately 0.7 $V_{DH}$, which in the present invention has been shown to yield power savings on the order of 35% reduction in dynamic power consumption over standard static pulsed bus circuit and a 12-15% increase in performance. The interface bus of the present invention can also reduce static power consumption when the bus is inactive by approximately 65%.

The present invention reduces the power consumption by reducing the effect of coupling capacitance between each bit-line segment that connects inverters I1, I2 through $I_N$, $I_{N+1}$ with other, parallel bit-line segments carrying other data bits (not shown), as is attained in static pulsed buses in general. However, the depicted circuit further reduces power consumption by maintaining every other stage of the bus (e.g. the outputs of inverters I1 and $I_N$) at a reduced voltage level between pulses, reducing the energy needed to switch those inverters to the opposite supply rail when a pulse is received. Further, because inverters I1 and $I_N$ are supplied with a lowered positive power supply $V_{DL}$, when a boosted positive pulse is received at the input to inverters I1 and $I_N$, PMOS device P1 in inverters I1 and $I_N$ is driven farther into cut-off, permitting NMOS device N1 to turn on faster, reducing cross-conduction energy and thus reducing overall power consumption, while reducing bus delay. The voltage reduction also provides the added benefit of reducing the magnitude of power supply current spikes from switching the bus repeater stages, both by reducing cross-conduction energy and also by lowering the stored energy associated with the static bus voltage. When the bus is inactive, the reduction in the power supply voltage present across inverters I1, I2 through $I_N$, $I_{N+1}$ reduces the power consumption accordingly, and any additional leakage sources present along the bus segments connected to the outputs of the even inverters (e.g., inverters I2, $I_{N+1}$), will also have reduced current, due to the lowered static voltage level present on the bus segments.

Figure 2:
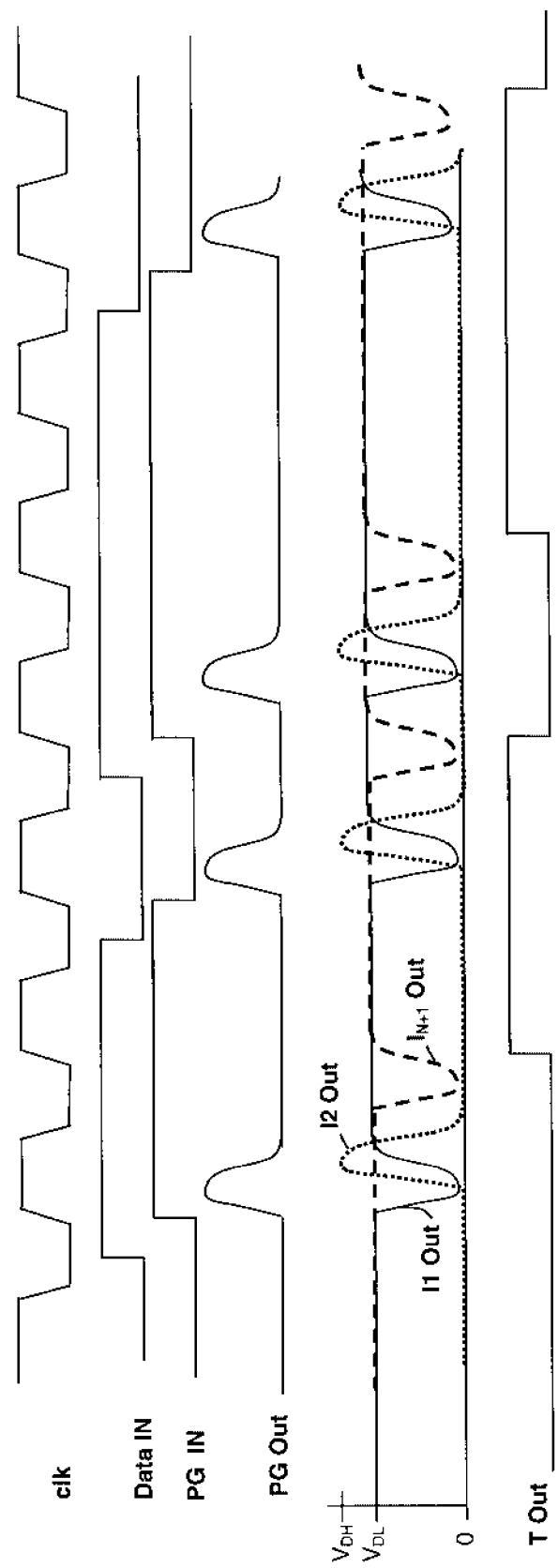
FIG. 2 is a time-voltage diagram depicting the relationship of signals in the bus of FIG. 1.

Referring now to FIG. 2, signals within the circuit of FIG. 1 are illustrated in a time-voltage diagram. The input to Pulse generator 12 is illustrated as PG IN and is derived from the Data IN signal by latching the Data IN signal on rising edges of clock signal clk. Signal PG Out is the output of pulse generator 12 and is applied to the cascaded inverter chain I1-$I_{N+1}$. The signals at the outputs of inverters I1, I2 and $I_{N+1}$ and are denoted as I1 Out, I2 Out, and $I_{N+1}$ Out, respectively. As can be seen in the diagram, signals I1 Out and $I_{N+1}$ Out are falling-voltage pulses having a quiescent value of $V_{DL}$ and a pulse peak value of zero. Signal I2 Out has a quiescent value of zero and a pulse peak value of $V_{DH}$. Signal T Out is the reconstructed data signal at the output of toggle flip-flop 14.

Figure 3:
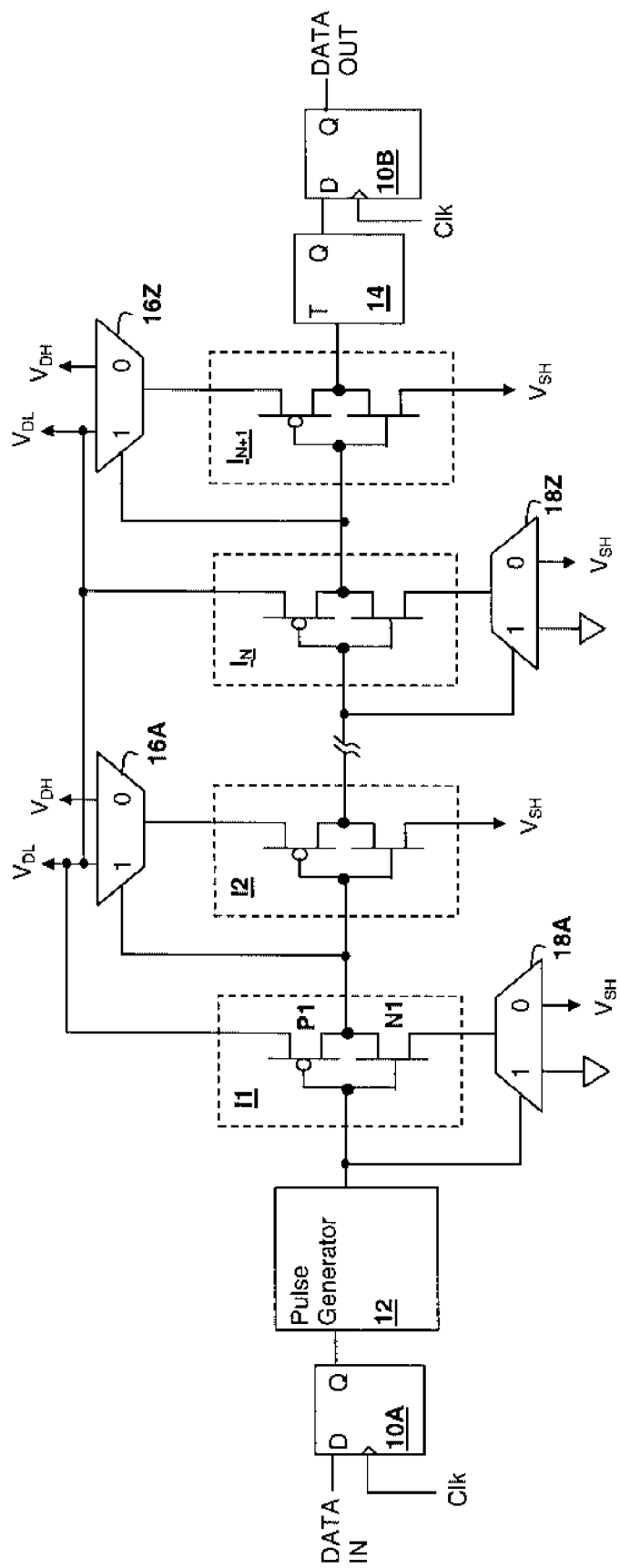
FIG. 3 is a schematic diagram of a bus in accordance with an embodiment of the invention.

Referring now to FIG. 3, a bus circuit in accordance with another embodiment of the present invention. The depicted embodiment is similar to that of the circuit of FIG. 1, and therefore only differences between them will be described below. In contrast to the embodiment of FIG. 1, each of the bus repeater stages provided by inverters I1, I2 through $I_N$, $I_{N+1}$ has a selectable power supply rail voltage. Additional selectors 18A through 18Z select between a third and fourth power supply voltage, depicted as ground and $V_{SH}$. In the circuit of FIG. 3, the quiescent voltage on the outputs of inverters I1 and $I_N$ is greater than in the circuit of FIG. 1, or in other terms, the magnitude of the power supply voltage is selectably reduced for I1 and $I_N$ just as the magnitude of the power supply voltage supplied to inverters I2 and $I_{N+1}$ is reduced in both the circuit of FIG. 1 and the circuit of FIG. 3. The selection input of selectors 18A through 18Z are connected to the inputs of the corresponding inverters I1 and $I_N$ so that when a pulse is received at the inputs of those inverters, the (lower) power supply rail connected to transistor N1 in those inverters is reduced to zero. When the pulse at the input of the inverter terminates, the power supply rail is selectably restored to $V_{SH}$.

The lower power supply rails of inverters I2 and $I_{N+1}$ are connected to a fourth power supply $V_{SH}$, rather than ground as in the circuit of FIG. 1. The resulting circuit has the similar advantages as in the circuit of FIG. 1, with an extension of the benefits described above with respect to the circuit of FIG. 1 to all bus repeater stages, and a reduction in static bus voltage at all bus repeater stages to a static voltage of $V_{DL}$-$V_{SH}$. For example, transistor N1 of inverters I2 and $I_{N+1}$ will be driven further into cutoff because of a gate pulse peak voltage of zero, with a source voltage $V_{SH}$, permitting transistor P1 of inverters I2 and $I_{N+1}$ to charge the bus to voltage $V_{DH}$ faster and reducing cross-conduction switching energy in inverters I2 and $I_{N+1}$. The circuit of FIG. 3 will have a static and dynamic power consumption even lower than that of the circuit of FIG. 1, with the penalty of added complexity, circuit area and the additional requirement of a fourth power supply output.

Figure 4:
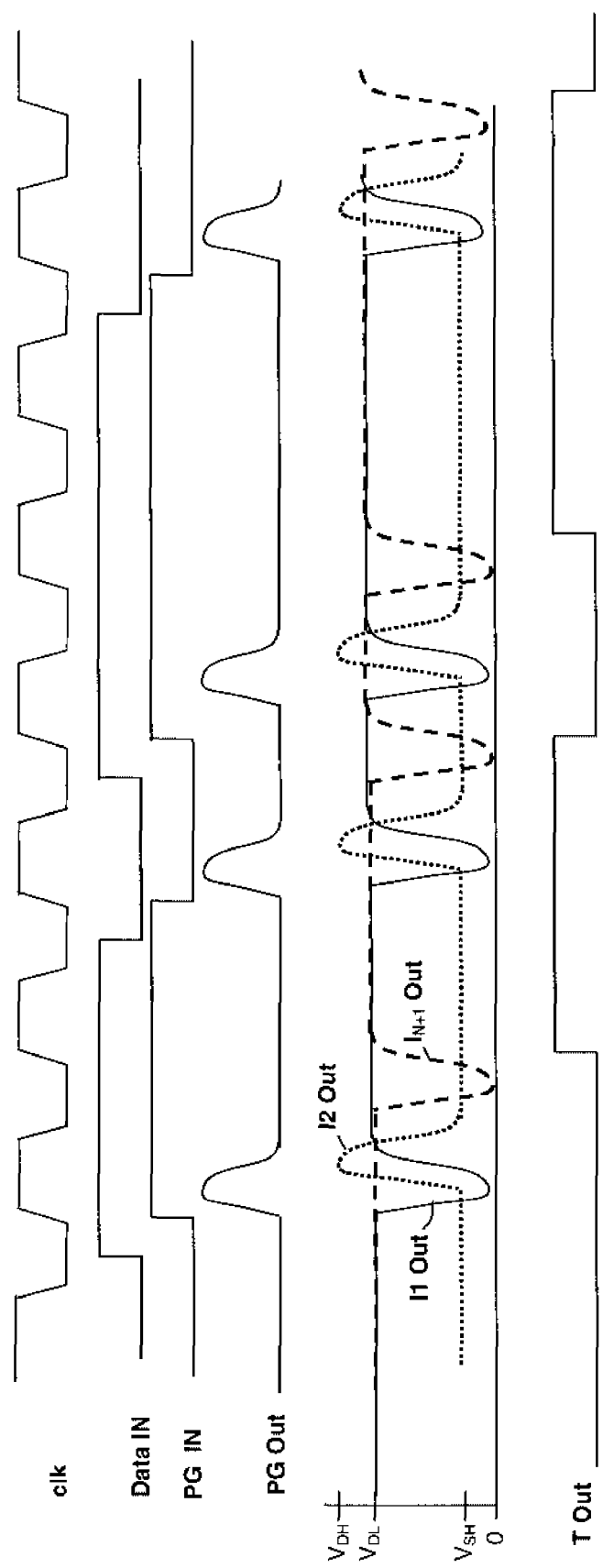
FIG. 4 is a time-voltage diagram depicting the relationship of signals in the bus of FIG. 3.

Referring now to FIG. 4, signals within the circuit of FIG. 3 are illustrated in a time-voltage diagram. The input to Pulse generator 12 is illustrated as PG IN and is derived from the Data IN signal by latching the Data IN signal on rising edges of clock signal clk. Signal PG Out is the output of pulse generator 12 and is applied to the cascaded inverter chain I1-$I_{N+1}$. The signals at the outputs of inverters I1, I2 and $I_{N+1}$ and are denoted as I1 Out, I2 Out, and $I_{N+1}$ Out, respectively. As can be seen in the diagram, signals I1 Out and $I_{N+1}$ Out are falling-voltage pulses having a quiescent value of $V_{DL}$ and a pulse peak value of zero. Signal I2 Out has a quiescent value of $V_{SH}$ and a pulse peak value of $V_{DH}$. Signal T Out is the reconstructed data signal at the output of toggle flip-flop 14.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A bus circuit, comprising:
a plurality of odd bus repeater circuits for receiving and repeating pulses;
a plurality of even bus repeater circuits for receiving and repeating pulses, connected in alternation between the odd bus repeater circuits, wherein an output of said odd bus repeater circuits is connected to an input of a corresponding one of said even bus repeater circuits and an output of said even bus repeater circuits is connected to an input of a corresponding next one of said odd bus repeater circuits, and wherein said bus repeater circuits of at least one of said pluralities of bus repeater circuits have a selectable voltage power supply rail, wherein said selectable voltage is set at said bus repeater circuits in conformity with a logical state of said input of said bus repeater circuits, whereby power consumption of said bus circuit is reduced by reducing leakage through said bus repeater circuits.

2. The bus circuit of claim 1, wherein said bus repeaters of said at least one of said pluralities of bus repeater circuits comprise a selector having a select input connected to said input of said bus repeater circuits, and wherein said selector has a first input connected to a first power supply having a first power supply voltage value, a second input connected to a second power supply having a second power supply voltage value lower than said first power supply voltage value.

3. The bus circuit of claim 2, wherein said bus repeater circuits comprise inverters having an input providing said input of said bus repeater circuits, an output providing said output of said bus repeater circuits, a first power supply rail connection connected to an output of said selector, and a second power supply rail connection connected to a third power supply.

4. The bus circuit of claim 2, wherein said at least one of said pluralities of bus repeater circuits is said plurality of even bus repeater circuits, and wherein said plurality of odd bus repeater circuits has a first power supply rail connection connected to said second power supply.

5. The bus circuit of claim 1, wherein both of said pluralities of even bus repeater circuits have a selectable voltage power supply rail, wherein said selectable voltage is set at said bus repeater circuits in conformity with a logical state of said input of said bus repeater circuits, and wherein said selectable voltage power supply rail of said plurality of even bus repeater circuits is an opposite power supply rail from said selectable voltage power supply rail of said plurality of odd bus repeater circuits.

6. The bus circuit of claim 5, wherein said bus repeater circuits comprise a selector having a select input connected to said input of said bus repeater circuit, wherein in said plurality of odd repeater circuits said selector has a first input connected to a first power supply having a first power supply voltage value, a second input connected to a second power supply having a second power supply voltage value lower than said first power supply voltage value, and wherein in said plurality of even repeater circuits said selector has a first input connected to a third power supply having a third power supply voltage value, a second input connected to a fourth power supply having a fourth power supply voltage value lower than said third power supply voltage value.

7. The bus circuit of claim 6, wherein said bus repeater circuits have a first power supply rail and a second power supply rail for connection to a voltage lower than that supplied to said first power supply rail, and wherein in said plurality of odd bus repeater circuits said first power supply rail is connected to an output of said selector and said second power supply rail is connected to said third power supply.

8. The bus circuit of claim 7, wherein in said plurality of even bus repeater circuits said second power supply rail is connected to an output of said selector and said first power supply rail is connected to said second power supply.

9. The bus circuit of claim 8, wherein said bus repeater circuits comprise an inverter having an input providing said input of said bus repeater circuit, an output providing said output of said bus repeater circuit, a first power supply rail connection and a second power supply rail connection, and wherein in said plurality of odd bus repeaters, said first power supply rail connection is connected to said output of said selector and said second power supply rail connection is connected to said third power supply, and wherein in said plurality of even bus repeaters, said first power supply rail connection is connected to said second power supply and said second power supply rail connection is connected to said output of said selector.

10. A method of operating a bus for transmission of a digital signals as a bus input, comprising:
repeating a pulsed representation of said digital signal through a series of alternatively connected plurality of even and plurality of odd bus repeaters;
selecting within at least one of said plurality of even and plurality of odd bus repeaters, a power supply rail voltage selectable among at least two power supply voltages, wherein said selecting is performed in conformity with a logic value of said digital signal as it arrives at said bus repeater, whereby power consumption is reduced by reducing leakage through said bus repeaters.

11. The method of claim 10, wherein said selecting selects a greater of said at least two power supply voltages when said value of said digital signal indicates that an active pulse has arrived from a previous bus repeater.

12. The method of claim 11, wherein said selecting further selects a lesser of said at least two power supply voltages when said value of said digital signal indicates that said active pulse has terminated.

13. The method of claim 10, wherein said selecting selects said power supply rail voltage between a first and a second power supply voltage as an upper power supply rail of said plurality of odd bus repeaters, wherein said first power supply voltage is greater than said second power supply voltage.

14. The method of claim 13, further comprising providing said second power supply voltage as an upper power supply rail of said plurality of even bus repeaters.

15. The method of claim 12, wherein said selecting further selects said power supply rail voltage between a third and a fourth power supply voltage as a lower power supply rail of said plurality of even bus repeaters, wherein said third power supply voltage is greater than said fourth power supply voltage.

16. The method of claim 15, further comprising providing said third power supply voltage as a lower power supply rail of said plurality of odd bus repeaters.

17. A bus circuit, comprising:
a plurality of cascaded pulsed bus repeater circuits; and
means within at least every other one of said bus repeater circuits for dynamically raising a power supply voltage magnitude of said bus repeater circuit when a pulse is being repeated from an input of said at least every other one of said bus repeater circuits, and lowering said power voltage magnitude when said pulse has been repeated, whereby power consumption of said bus circuit is reduced by reducing leakage through said bus repeater circuits.

18. The bus circuit of claim 17, wherein said means for dynamically raising a power supply voltage magnitude comprises means within said plurality of cascaded bus repeater circuits for dynamically raising a power supply voltage magnitude of said plurality of cascaded bus repeater circuits when said pulse is being repeated at said bus repeater circuit.

19. The bus circuit of claim 17, wherein said means for dynamically raising a power supply voltage magnitude comprises means within every other one of said plurality of cascaded bus repeater circuits for dynamically raising a power supply voltage magnitude of said plurality of cascaded bus repeater circuits when said pulse is being repeated at said every other bus repeater circuit.

20. An electronic circuit, comprising:
    a plurality of cascaded inverters comprising a first transistor having a first channel connection connected to a first power supply rail, a second transistor having a first channel connection coupled to a second power supply rail and a second channel connection connected to a second channel connection of said first transistor; and
    a first plurality of selectors having a first input connected to a first power supply having a first power supply voltage, a second input connected to a second power supply having a second power supply voltage lower than said first power supply voltage, wherein said selector selectively couples said first power supply rail of a corresponding one of every other one of said cascaded inverters to both said first and second power supply, and wherein said selectors have a selection input connected to an input of said corresponding inverter.

21. The electronic circuit of claim 20, wherein said first power supply rail of all inverters other than said every other one of said inverters is connected to said second power supply.

22. The electronic circuit of claim 20, further comprising a second plurality of selectors having a first input connected to a third power supply having a third power supply voltage, a second input connected to a fourth power supply having a fourth power supply voltage lower than said third power supply voltage, wherein said selector selectively couples said second power supply rail of a corresponding one of all inverters other than said every other one of said inverters to both said third and fourth power supply, and wherein said second plurality of selectors have a selection input connected to an input of said corresponding inverter.

23. The electronic circuit of claim 22, wherein said first power supply rail of all inverters other than said every other one of said inverters is connected to said second power supply.

24. The electronic circuit of claim 23, wherein said second power supply rail of said every other one of said inverters is connected to said third power supply.

25. The electronic circuit of claim 22, wherein said second power supply rail of said every other one of said inverters is connected to said third power supply.

\* \* \* \* \*